(12) United States Patent
Wang et al.

(10) Patent No.: US 12,126,884 B1
(45) Date of Patent: Oct. 22, 2024

(54) SUBSTRATE TO PLACE COMPONENTS FOR CAMERA SIZE REDUCTION

(71) Applicant: Apple Inc., Cupertino, CA (US)

(72) Inventors: Qi Wang, Sunnyvale, CA (US); Ashirwad Bahukhandi, Sunnyvale, CA (US); Daniel R Hennigan, Livermore, CA (US); Kai Min, San Jose, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 17/664,352

(22) Filed: May 20, 2022

Related U.S. Application Data

(60) Provisional application No. 63/196,145, filed on Jun. 2, 2021.

(51) Int. Cl.
*H04N 23/54* (2023.01)
*H04N 23/52* (2023.01)

(52) U.S. Cl.
CPC ............. *H04N 23/54* (2023.01); *H04N 23/52* (2023.01)

(58) Field of Classification Search
CPC .............................. H04N 23/54; H04N 23/55
See application file for complete search history.

(56) References Cited

U.S. PATENT DOCUMENTS

| | | | |
|---|---|---|---|
| 6,376,329 B1 | 6/2002 | Sogard et al. | |
| 7,929,033 B2 | 4/2011 | Lee et al. | |
| 8,759,930 B2 | 6/2014 | Oganesian | |
| 9,496,247 B2 | 11/2016 | Oganesian et al. | |
| 10,186,499 B2 | 1/2019 | Seidemann et al. | |
| 10,321,826 B2 | 6/2019 | Won | |
| 10,911,727 B2 | 2/2021 | MacKinnon | |
| 11,706,516 B2 * | 7/2023 | Wang .................... | H04N 13/239 348/374 |
| 2006/0092285 A1 | 5/2006 | Shin | |
| 2007/0153861 A1 | 7/2007 | Collins et al. | |
| 2009/0051774 A1 * | 2/2009 | Shiraishi ................ | H04N 23/57 348/207.99 |
| 2009/0122176 A1 * | 5/2009 | Wu ........................ | H04N 23/54 348/340 |
| 2010/0119236 A1 | 5/2010 | Uno et al. | |
| 2011/0038282 A1 | 2/2011 | Mihota et al. | |

(Continued)

OTHER PUBLICATIONS

Yue Liu, "Heterogeneous Integration of OE Arrays with Si Electronics and Microoptics", IEEE Transactions on Advanced Packaging, vol. 25, No. 1, Feb. 2002, pp. 1-8.

(Continued)

*Primary Examiner* — Amy R Hsu
(74) *Attorney, Agent, or Firm* — Robert C. Kowert; Kowert, Hood, Munyon, Rankin & Goetzel, P.C.

(57) ABSTRACT

A camera may include a substrate for placing components. An image sensor having a light-receiving side and an opposite non-light-receiving side may be attached to a first side of the substrate to receive light from one or more lenses of the camera to capture an image. The camera may also include one or more additional components separate and distinct from the image sensor. The additional components may be placed beneath the non-light-receiving side of the image sensor. The components may be attached to a second side of the substrate opposite the first side where the image sensor is mounted at least partially inside one or more recesses, or embedded at least partially inside the substrate.

20 Claims, 8 Drawing Sheets

(56) References Cited

U.S. PATENT DOCUMENTS

| | | |
|---|---|---|
| 2013/0122617 A1 | 5/2013 | Lott et al. |
| 2014/0079088 A1 | 3/2014 | Joseph |
| 2014/0293124 A1 | 10/2014 | Chen |
| 2015/0063396 A1 | 3/2015 | Jikutani et al. |
| 2016/0305774 A1 | 10/2016 | Ross, Jr. et al. |
| 2016/0327785 A1 | 11/2016 | Truscott et al. |
| 2017/0155811 A1* | 6/2017 | Jagt .......................... F21V 9/38 |
| 2018/0007252 A1 | 1/2018 | Tuulos et al. |
| 2019/0162769 A1* | 5/2019 | Zhao .................... H05K 7/1427 |
| 2019/0207431 A1 | 7/2019 | Youn et al. |
| 2020/0286933 A1* | 9/2020 | Tanaka ................... H04N 23/55 |
| 2021/0152789 A1 | 5/2021 | MacKinnon |
| 2022/0095448 A1* | 3/2022 | Niu ........................ H05K 1/181 |
| 2022/0115426 A1* | 4/2022 | Son ........................ H04N 23/54 |

OTHER PUBLICATIONS

Brian Corbett, et al., "Strategies for integration of lasers on silicon", Semiconductor Science and Technology, IOP Publishing, 2013, pp. 1-6.

* cited by examiner

SUBSTRATE TO PLACE COMPONENTS FOR CAMERA SIZE REDUCTION

This application claims benefit of priority to U.S. Provisional Application Ser. No. 63/196,145, entitled "Substrate to Place Components for Camera Size Reduction," filed Jun. 2, 2021, and which is hereby incorporated herein by reference in its entirety.

BACKGROUND

Technical Field

This disclosure relates generally to a camera and more specifically to a camera with a substrate for components placements.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may incorporate an autofocus (AF) mechanism whereby the object focal distance can be adjusted to focus an object plane in front of a camera at an image plane to be captured by the image sensor. In some cameras, the AF mechanisms can be implemented by moving the optical lenses as a single rigid body along the optical axis of the camera. Furthermore, some cameras may incorporate an optical image stabilization (OIS) mechanism that can sense and react to external excitation/disturbance by adjusting position of the image sensor relative to the lenses in an attempt to compensate for unwanted motion of the lenses. The advent of the mobile multipurpose devices has resulted in a high requirement for cameras, in terms of image quality but also size of the cameras. Therefore, it is desirable to have techniques capable of reducing the size of cameras in mobile multipurpose devices.

Figure 1A:
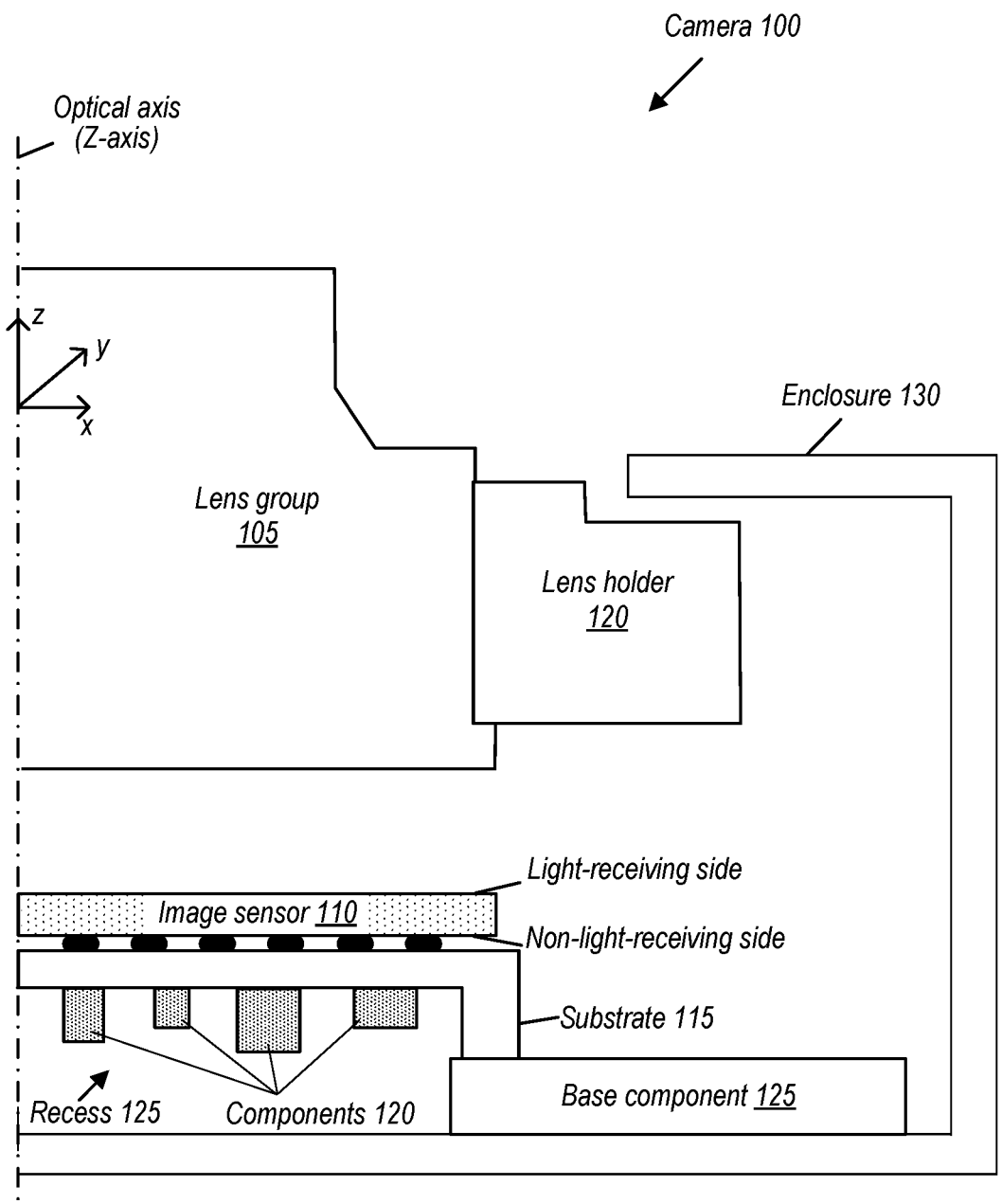
FIGS. 1A-1E show an example camera, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the"

are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera with a substrate for placing or holding components. In some embodiments, the camera may include a lens group having one or more lenses, an image sensor, and at least one substrate. The image sensor may have a light-receiving side and non-light-receiving side opposite the light-receiving side. The image sensor may be attached to the substrate at a first side (e.g., the top side) of the substrate with the light-receiving side facing the lenses, such that the light-receiving side may receive light having passed through the lenses to capture an image. In some embodiments, the image sensor may include a sensor that may be used to capture light and/or signals in visible and/or invisible portions of the electromagnetic spectrum. For instance, in some embodiments, the image sensor may be a CCD or CMOS sensor that are commonly used to capture visible light. Alternatively, in some embodiments, the image sensor may include a thermal sensor or single-photon avalanche diode (SPAD) sensor to detect gamma, x-rays, beta and alpha particles along with a wide portion of the electromagnetic spectrum from ultraviolet (UV) through the visible wavelengths and into the infrared (IR). The camera may further include one or more additional components distinct from the image sensor that are also mounted to the substrate. In some embodiments, these components may be placed at a second side (e.g., the bottom side) of the substrate opposite the first side where the image sensor is mounted. In addition, in some embodiments, these components may be placed at one or more positions beneath the non-light-receiving side of the image sensor, such that the components may at least partially overlap with the image sensor at the first side of the substrate. In some embodiments, the substrate may include one or more recesses, cavities or pockets at the second side of the substrate beneath the non-light-receiving side of the image sensor, and the components distinct from the image sensor may be attached to the second side of the substrate at least partially inside the recesses. Alternatively, in some embodiments, these components may be embedded at least partially within the substrate, beneath the non-light-receiving side of the substrate. The camera with the disclosed substrate assembly (including the substrate and associated image sensor and additional components attached to the substrate) may be integrated as part of a mobile multipurpose device, such as a smartphone, a tablet, a pad device, and the like.

Moreover, in some embodiments, the camera or substrate assembly disclosed herein may be used for other applications, such as automotive applications (e.g., as part of a sensing system for advanced driver-assistance system or autonomous driving system) or as part of a product with or without a display.

The disclosed substrate assembly provides several benefits. One, in some embodiments, the image sensor may be attached to the second side of the substrate with the light-receiving side still facing the lenses. The substrate may have an opening, e.g., above the light-receiving side of the image sensor, such that light from the lenses may still be able to pass through the opening to reach the light-receiving side of the image sensor. The additional components distinct from the image sensor may be attached to the first side of the substrate, outside the opening area. Such designs can be space-consuming because the opening area is dedicated to the image sensor and cannot be used to hold other components. Therefore, as described in this disclosure, the space at the first side of the substrate can be freed up by moving the image sensor to the first side (e.g., removing and occupying the previous opening area) and placing the additional components beneath the non-light-receiving side of the image sensor on or at least partially within the substrate (e.g., occupying readily-available space below or inside the substrate). Further, because these components beneath the non-light-receiving side of the image sensor may at least partially overlap with the image sensor, they do not require additional space at the second side of the substrate either. As a result, the size of the substrate assembly in one or more directions (e.g., for the length and/or width of the substrate along X- and/or Y-axis) may be reduced. Two, the thickness or height of the overall substrate assembly (e.g., along Z-axis orthogonal to X-Y axes) is normally dominated by the taller components placed on the substrate, generally not the image sensor. Thus, by placing the components inside one or more recesses at the second side of the substrate or embedding them at least partially within the substrate, the thickness or height of the substrate assembly can be reduced. The size reduction of the substrate assembly along X, Y, and/or Z-axis can further lead to the size and footprint reduction of the camera as well. Three, moving the components beneath the non-receiving-side of the image sensor may allow the components to be placed closer to the image sensor. This can improve performance of the image sensor. For instance, in some embodiments, a power supply (e.g., a linear dropout or LDO regulator) and/or a capacitor of a power supply may be moved closer to the image sensor when placed beneath the image sensor. This can boost the terminal voltage at the image sensor and improve its operation. Four, electrical components in operation can produce heat and/or electromagnetic noises (e.g., radio-frequency or RF noises). Thus, when the components are placed beneath the non-receiving-side of the image sensor, e.g., inside recesses at the second side of the substrate or embedded at least partially within the substrate, the substrate may naturally form thermal and/or electromagnetic interference (EMI) insulation between the image sensor and the components. This can reduce the thermal and/or EMI impacts on the image sensor and improve performance of the image sensor. Five, the above-described designs may provide extra space proximate (e.g., above) the image sensor, such that it may now become possible to increase the size of other components (e.g., an infrared filter placed between the image sensor and the lenses) and/or allow the lenses to get closer to the image sensor to improve the camera's optical performance.

FIGS. 1A-1E show an example camera, according to some embodiments. For purposes of illustration, only relevant components are illustrated in the figures. In the cross-sectional view in FIG. 1A, camera 100 may include lens group 105 that may include one or more lenses, image sensor 110, and at least one substrate 115. For purposes of illustration, FIG. 1A also shows an optical coordination system defined by X-Y-Z axes, where Z-axis is chosen to be in parallel to the optical axis of lens group 105. In some embodiments, the optical axis may correspond to the transmission path of a principal light ray passing through the lenses to the image sensor. In some embodiments, the transmission path of the principal light ray within camera 100 may not necessary be a straight but rather a folded line, e.g., when camera 100 includes a light folding element as part of the one or more lenses that may change the transmission direction of the principal light ray. In that case, the optical axis may refer to any straight part of the folded line. In some embodiments, image sensor 110 may include a light-receiving side and a non-light-receiving side opposite the light-receiving side, as indicated in FIG. 1. In some embodiments, image sensor 110 may be attached or mounted to substrate 115, e.g., at a first side (e.g., the top side) of substrate 115 with the light-receiving side facing lens group 105, such that the light-receiving side may receive light having passed through the lenses to capture an image. As described above, image sensor 110 may include a CCD, CMOS, thermal, or SPAD sensor, according to some embodiments. In some embodiments, substrate 115 may include an organic substrate, a ceramic substrate, a substrate including both organic and ceramic portions, or a substrate using any other appropriate substrate materials. For instance, substrate 115 may include a ceramic portion upon which image sensor 110 may be mounted, as well as an organic portion (e.g., a printed circuit board (PCB) made of polyimide, ajinomoto build-up film (ABF) and/or other materials) that is attached to the ceramic portion and used for routing electrical traces and/or holding other components. In some embodiments, substrate 115 may be part of a rigid-flex structure that includes both rigid portions and flexible portions. For instance, substrate 115 may include organic and ceramic portions, and constitute a rigid portion of the rigid-flex structure. The rigid-flex structure may further include one or more flexible circuits connected to substrate 115. In some embodiments, substrate 115 and the flexible circuits may individually include multiple layers, and some layers of substrate 115 may electrically connect to the layers of the flexible circuits such that electrical signals may be routed to and/or from substrate 115 via the flexible circuits. In some embodiments, substrate 115 may be attached with basc component 125 that is further attached with enclosure 130 of camera 100. As indicated in FIG. 1A, in some embodiments, lens group 105 may be contained inside lens holder 120.

In some embodiments, camera 100 may include one or more components 120 that are distinct from image sensor 110. Components 120 may be also mounted to substrate 115, e.g., attached to a second side (e.g., the bottom side) of substrate 115 opposite the first side where image sensor 110 is mounted. In some embodiments, components 120 may be positioned beneath the non-light-receiving side of image sensor 110. For instance, components 120 may be placed behind image sensor 110 along the optical axis (e.g., Z-axis), such that components 120 may at least partially overlap with image sensor 110. As described above, components 120 may utilize the readily-available space between substrate 115 and enclosure 130 of camera 100. In addition, in some embodiments, substrate 115 may include one or more recesses 125, and components 120 may be placed at least partially inside recesses 125. In other words, recesses 125 may be chosen at one or more locations beneath the non-light-receiving image sensor 110 (e.g., behind image sensor 110 along the optical axis), and components 120 may be mounted to substrate 115 at the second side of substrate inside recesses 125 to at least partially overlap with image sensor 110. In some embodiments, depth or height of recesses 125 (e.g., measured along Z-axis) may be determined based on one or more factors including, e.g., the original thickness or height of substrate 115, the available space between substrate 115 and enclosure 130, dimensions of components 120, a desired distance between lens group 105 and image sensor 110, and so on. In some embodiments, substrate 115 may be implemented using any appropriate materials. For instance, substrate 115 may include an organic substrate, a ceramic substrate, a combination of both organic and ceramic portions, or a substrate using any other appropriate substrate materials. In some embodiments, substrate 115 may be part of a printed circuit board (PCB)—e.g., the substrate may be a PCB.

In this example, for purposes of illustration, FIG. 1A shows only one single recess 125, and components 120 are placed all inside this one single recess 125. In some embodiments, substrate 115 may include multiple recesses 125 that are separate and disconnected from each other, where components 120 may be divided groups and each group may be individually placed at least partially inside one respective recess. Note that the term "recess" may broadly refer to a cavity, a pocket, and the like that may reduce the thickness or height of the substrate at the recess relative to other parts of the substrate without a recess. As discussed above, the resultant substrate assembly in FIG. 1A (including substrate 115 and associated components attached to substrate 115, such as image sensor 110 and components 120) can reduce the size of the substrate assembly in multiple directions. For instance, moving components 120 from the first side (e.g., the top side) of substrate 115 to the second side (e.g., the bottom side) of substrate 115, beneath the non-receiving-light side of image sensor 110, can reduce the length and/or width of the substrate assembly along X- and/or Y-axis. Further, placement of components 120 inside recesses 125 can reduce the thickness or height of the substrate assembly along Z-axis. The size reduction of the substrate assembly along the multiple directions (e.g., in X-, Y-, and/or Z-axis) can contribute to overall footprint reduction for camera 100 as well.

In some embodiments, camera 100 may include autofocus (AF) and/or optical image stabilization (OIS) functions. For instance, in some embodiments, camera 100 may include one or more actuators (not shown). Further, lens group 105 and lens holder 120, and/or image sensor 110 and substrate 115, may be designed to be movable relative to one another. For instance, in some embodiments, camera 100 may include flexures between lens holder 120 and enclosure 130, and/or between substrate 115 and base component 125. The flexures can provide a degree of motion freedom in one or more directions. As a result, lens group 105 and/or image sensor 110 may be moved using the actuators in the corresponding directions to implement the AF and/or OIS functions. For instance, in some embodiments, lens group 105 may be movable relative to image sensor 110 along Z-axis to perform AF, whilst image sensor 110 may be movable relative to lens group 105 along X- and/or Y-axis to perform OIS. In some embodiments, either lens group 105 or image sensor 110, alone, may be moved in (1) Z-axis and (2) X- and/or Y-axis to implement both the AF and OIS functions.

Figure 1B:
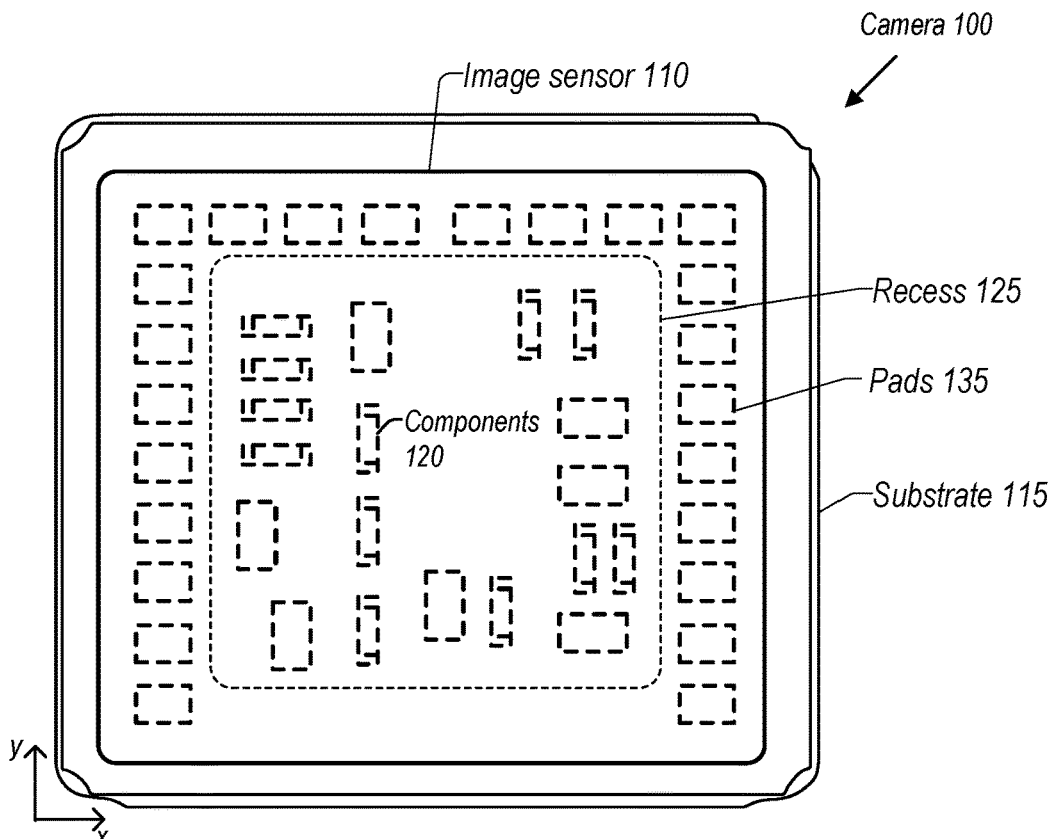

FIG. 1B shows a top view of the substrate assembly of camera 100. As seen in FIG. 1B, image sensor 110 may be mounted to substrate 115 at the first side (e.g., the top side) of substrate 115. In some embodiments, image sensor 110 may use a chip scale package (CSP), e.g., a flip-flop CSP (WL-CSP), a non-flip-flop CSP, a ball grid array (BGA), or any other types of CSPs. For instance, substrate 115 may have one or more layers and hold electrical traces at the layers, and image sensor 110 may use a ball grid array (BGA) package for connecting the terminals of image sensor 110 to the traces of substrate 115. In addition, as indicated in FIG. 1B, the substrate assembly may include one or more components 120 that are distinct from image sensor 110. Components 120 may be attached to substrate 115 at the second side (e.g., the bottom side) inside recesses 125 opposite the first side, at the position corresponding to image sensor 115 (e.g., underneath or approximately right below image sensor 115). Since components 120 are placed at the other side of substrate 115 beneath the non-light-receiving side of image sensor 110, they are not visible in the top view in FIG. 1B and thus are illustrated in dashed lines. As indicated in FIGS. 1A-1B, the connection pins of image sensor 110 may be under image sensor 110 facing components 120, rather than at a top side of image sensor 110 facing lenses 105. In some embodiments, components 120 may include one or more discrete components separate from image sensor 110, including, e.g., a capacitor, a power supply such as a LDO regulator, a resistor, an inductor, a sensor, a coil, a driver for an actuator, or other components. In some embodiments, components 120 may be used to support operations of image sensor 110, e.g., to provide appropriate voltages, implement actuation or movement functions, and/or transmit signals between image sensor 120 and other components. In some embodiments, one or more of the components may be a surface mount component. As described above, moving components 120 to the other side of substrate 115 and holding them inside recess 125 beneath the non-light-receiving side of image sensor 110 can reduce the size of the substrate assembly at least in X- and/or Y-axis. Thus, one goal here is to move as many components as allowed to the second side to minimize the number of components at the same side as image sensor 110 and maximize the size reduction for the substrate assembly in the X- and/or Y-axis. FIG. 1B also shows pads 135 at the second side of substrate 115. Pads 135 may refer to electrical connection pads for connecting the substrate assembly to other external components (e.g., an external power supply).

Figure 1C:
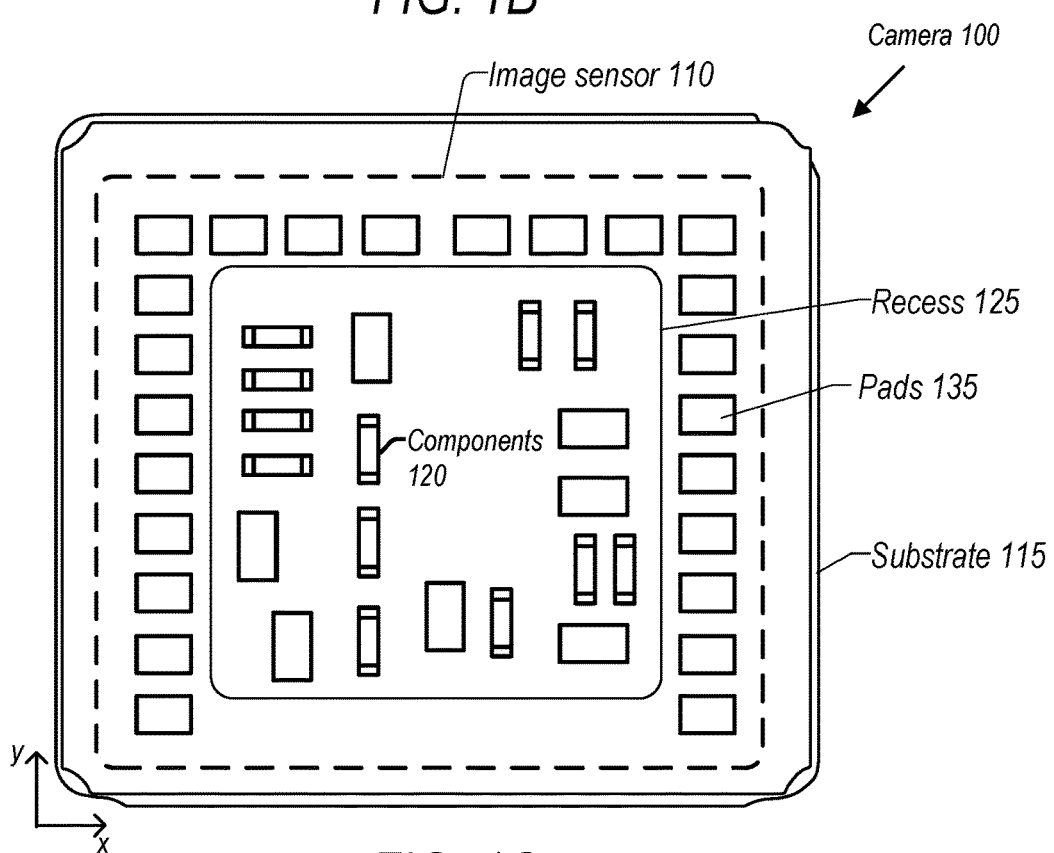

FIG. 1C shows a bottom view of the substrate assembly of camera 100, corresponding to the top view in FIG. 1B. Note that in FIG. 1C, image sensor 110 is depicted in dashed lines because it now becomes invisible in the bottom view, whilst components 120, the edge of recess 125, and pads 135 are shown in solid lines because they are visible in FIG. 1C.

Figure 1D:
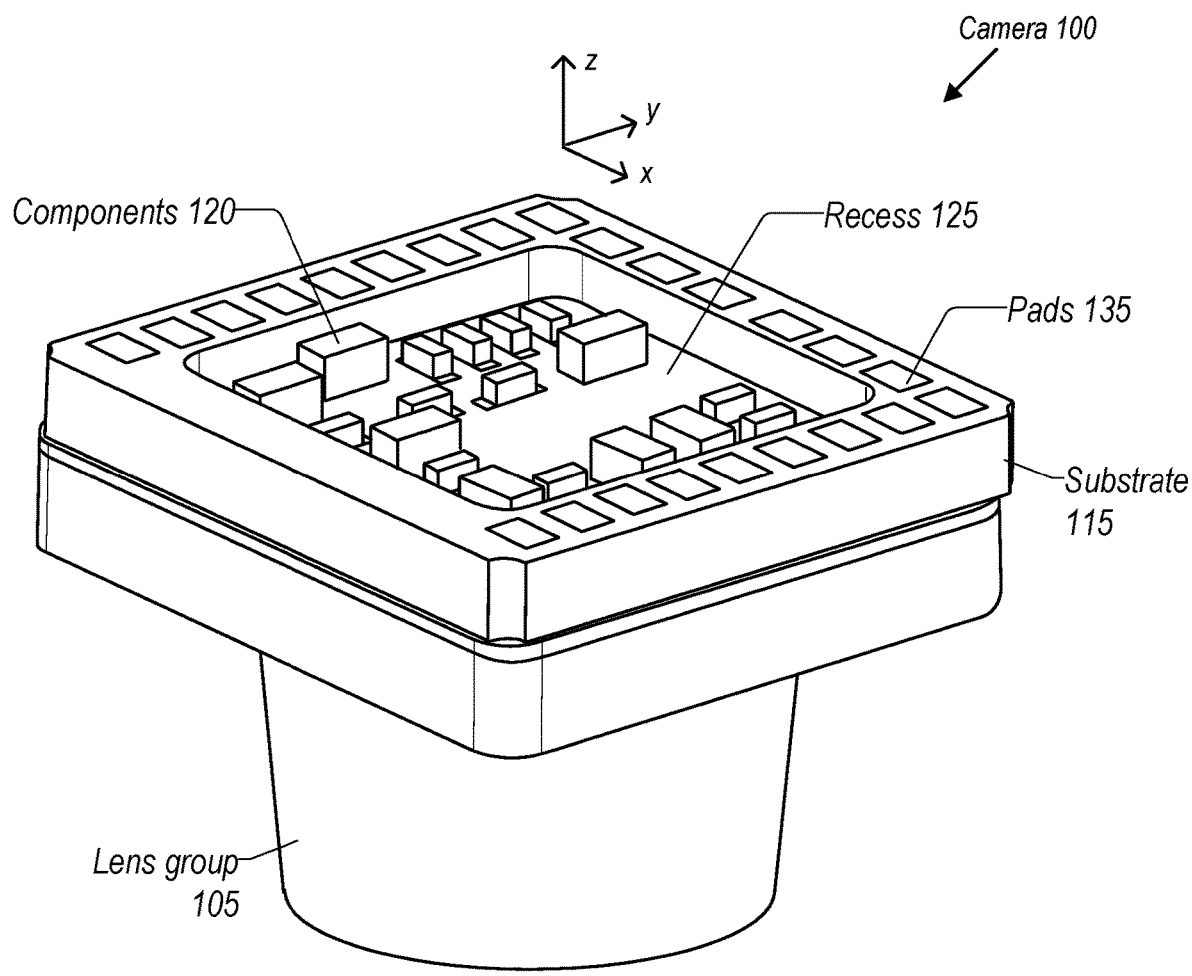

FIG. 1D is a corresponding perspective view of camera 100, in particular, showing the bottom section of the substrate assembly of camera 100. As indicated in FIG. 1D, components 120 distinct from image sensor 110 may be attached to substrate 115 at least partially inside recess 125 at the second (or bottom) side of substrate 115. The substrate assembly may further include pads 135 for connecting the substrate assembly to one or more external components. Note that in FIG. 1D, image sensor 110 is on the other side of substrate 115 and thus is not visible in this figure.

Figure 1E:
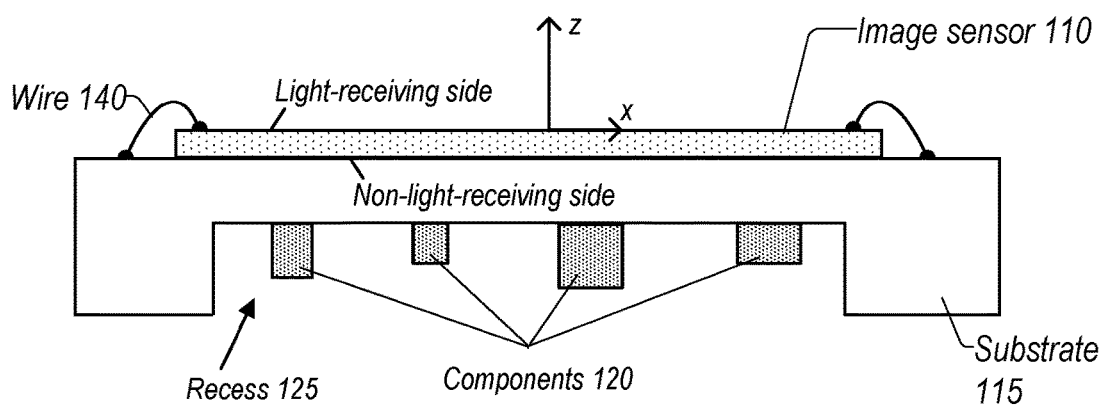

FIG. 1E shows another example substrate assembly, according to some embodiments. In this example, image sensor 110 may use a wirebond package that uses one or more wires 140 for connecting the terminals of image sensor 110 to the traces of substrate 115. Image sensor 110 may also include a light-receiving side and a non-light-receiving side opposite to the light-receiving side, like image sensor 110 of the CSP package described above. Compared to the CSP package in FIGS. 1B-1D, the wirebond package may increase the overall size of image sensor 110, according to some embodiments. However, regardless of the package of image sensor 110, the substrate assembly may still include components 120 distinct from image sensor 110 attached to substrate 115 at an opposite side at least partially inside recess 125 beneath the non-light-receiving side of image sensor 110.

Figure 2:
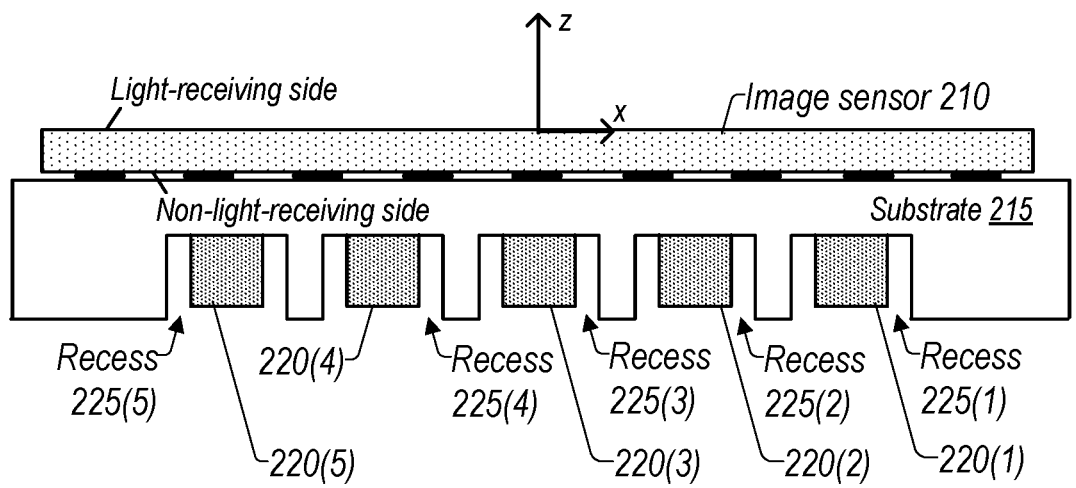
FIG. 2 shows an example substrate assembly, according to some embodiments.

FIG. 2 shows an example substrate assembly, according to some embodiments. In FIG. 2, the substrate assembly may include multiple recesses 225(1), 225(2), 225(3), 225(4), and 225(5) at a second side of substrate 215 opposite to the first side where image sensor 210 is mounted. In addition, components 220 distinct from image sensor 210 may be divided into groups and each group may be placed at least partially inside a respective recess. In this example, components 220 are split into groups 220(1), 220(2), 220(3), 220(4), and 220(5), where the component of each group may be placed inside a corresponding recess 225. As a result, components 220, distributed among different groups, may be placed inside recesses 225 beneath the non-light-receiving side of image sensor 210, e.g., behind image sensor 210 along the optical axis (e.g., Z-axis) such that components 220 may at least partially overlap with image sensor 210.

Figure 3:
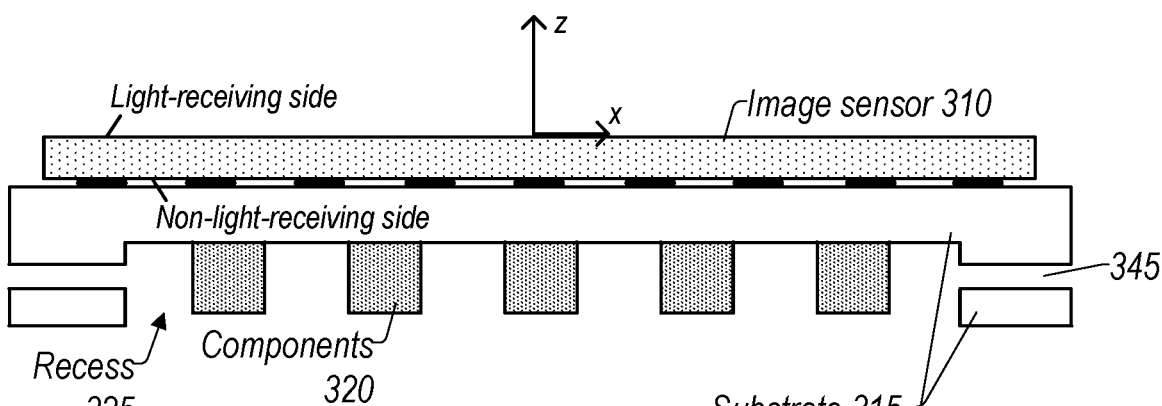
FIG. 3 shows another example substrate assembly, according to some embodiments.

FIG. 3 shows another example substrate assembly, according to some embodiments, in FIG. 3, the substrate assembly may include image sensor 310 attached to substrate 315 at a first side, and one or more components 320 attached to substrate 315 at a second side opposite the first side at least partially inside recess 325 positioned corresponding to image sensor 310. Further, in some embodiments, substrate 345 may include one or more thermal vias 345 for dissipating the heat created from components 320. In this example, thermal vias 345 may be located at the side wall of substrate 345 to dissipate the heat of component 320 from inside recess 325 to the external. Note that FIG. 3 is only an example for purposes of illustration. Thermal vias 345 may be created at other locations of substrate 315.

Figure 4:
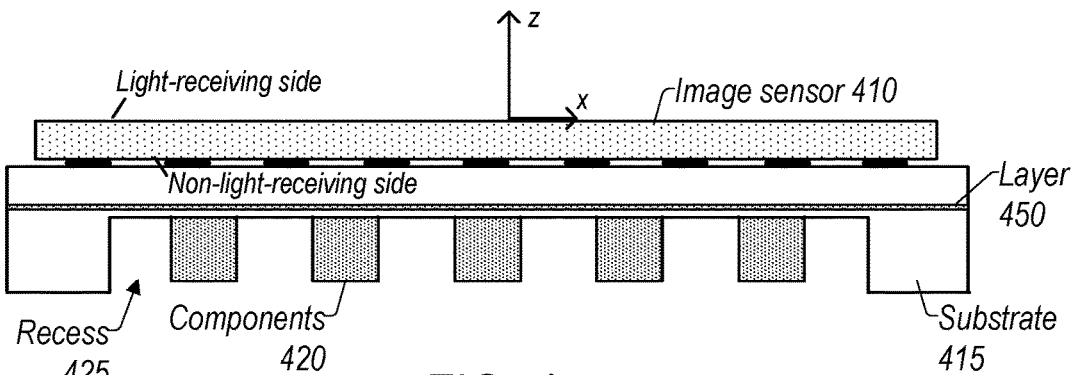
FIG. 4 shows another example substrate assembly, according to some embodiments.

FIG. 4 shows still another example substrate assembly, according to some embodiments. In FIG. 3, the substrate assembly may include image sensor 410 attached to substrate 415 at a first side, and one or more components 420 attached to substrate 415 at a second side opposite the first side at least partially inside recess 425 positioned corresponding to image sensor 410. In addition, in some embodiments, substrate 415 may include one or more layers 450 for providing EMI and/or thermal insulation between image sensor 410 and components 420. For instance, substrate 415 may be part of a PCB, and have multiple layers including layer 450. In some embodiments, layer 450 may be a ground layer, thus providing EMI insulation between image sensor 410 and components 420. Note that substrate 415 may still include one or more vias for connecting the layers inside substrate 415. Regardless, because layer 450 (e.g., a ground layer) covers the majority of the area between image sensor 410 and component 420. The vias would not significantly impact the insulation performance of layer 450. In some embodiments, the thermal and/or EMI layer may be attached to but outside substrate 415. For instance, in some embodiments, substrate 415 may include one or more thin film layers attached to the surface of recess 425, e.g., at the top and/or surrounding wall of recess 425, to shield components 420 to prevent the heat and/or EMI noises from components 420 from reaching image sensor 410.

The recess described above in the examples in FIGS. 1-4 may be created using any appropriate approaches. For instance, in some embodiments, a substrate may be formed by multiple laminated layers. A recess may be created by removing a portion of one or more layers of a substrate such that the thickness or height of the substrate is reduced at the recess relative to other portions of the substrate without a recess. For instance, when the substrate is a ceramic substrate, a portion of a layer may be removed using a punching process. Alternatively, when the substrate is an organic substrate, a portion of a layer may be removed using a selective etching process.

Figure 5:
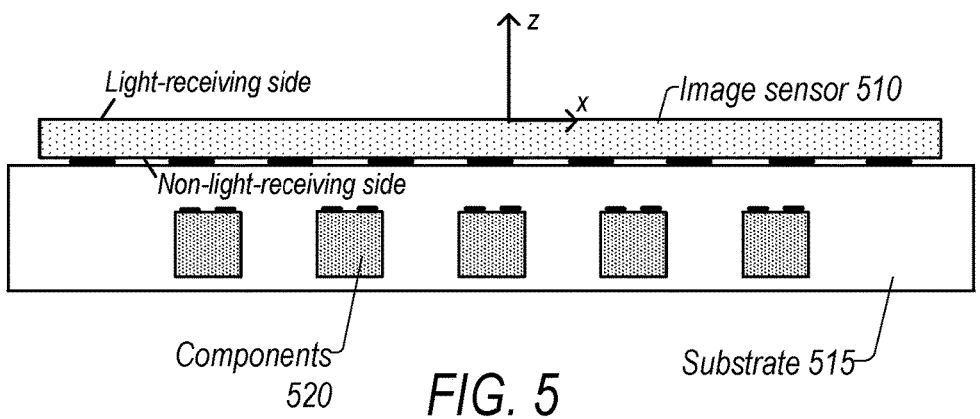
FIG. 5 shows another example substrate assembly, according to some embodiments.

As described, alternatively, in some embodiments, instead of being attaching to a substrate, e.g., at the second side of the substrate inside one or more recesses, the components may be embedded at least partially within a substrate at one or more positions beneath a non-light-receiving side of an image sensor. FIG. 5 shows another example substrate assembly, according to some embodiments. As indicated in FIG. 5, image sensor 510 may include a light-receiving side and a non-light-receiving side opposite the light-receiving side. Image sensor 510 may be attached to a first side of substrate 515, such that the light-receiving side of image sensor 510 may receive light having passed through one or more lenses to capture an image. By comparison, components 520 distinct from image sensor 510 may be embedded at least partially inside substrate 515 beneath the non-light-receiving side of image sensor 510 that is mounted at the first side of substrate 515. For instance, components 520, such as discrete components separate from image sensor 510, may be placed at least partially within substrate 515 behind image sensor 510 along the optical axis (or Z-axis), such that components 520 may at least partially overlap with image sensor 510. Similar to the recesses in FIGS. 1-4, embedding of components 520 may be implemented by removing a portion of one or more laminated layers of substrate 515. For instance, consider that substrate 515 includes 6 layers (e.g., layers #1~#6 from bottom to top) as an example, and components 520 are embedded at the middle two layers (e.g., layers #3 and #4). To implement the embedding, two layers at the bottom (layers #1 and #2) may be formed first, one layer after another (e.g., layer #2 on top of layer #1). Next, components 520 may be placed (with or without actual electrical connections) at appropriate position on top of layers 2. Next, two middle layers (layers #3 and #4) may be formed on top of the two bottom layers, where one or more portions of the two middle layers may be pre-removed to create spaces for accommodating components 520. Finally, the last two layers (e.g., layers #5 and #6) may be formed on top of the middle layers to complete substrate 515 and embed components 520 inside substrate 515. Image sensor 510 may be attached to the first top layer of substrate 515 (e.g., layer #6). As indicated in FIG. 5, in this example, components 520 may be surface mount devices, and the connection pins of components 520 may be positioned at top of components 520 facing the non-light-receiving side of image sensor 510. Thus, components 520 are displayed to be mounted or electrically connected to the layer above such as layer #4. Alternatively, in some embodiments, the connection pins of components 520 may be at the bottom of components 520, and thus components 520 may be mounted to the layer below such as layer #2. Compared to an open recess, embedding components 520 are completely covered by substrate 515. Therefore, there can be more areas of substrate 515, e.g., underneath and/or around components 515, available for routing electrical signals. Note that the embedding design in FIG. 5 may be also used with an image sensor having a wirebond package (e.g., image sensor 110 in FIG. 1E). Furthermore, the thermal vias, and the EMI and/or thermal insulation described in FIGS. 2-4 may also apply to the embedding design in FIG. 5.

Figure 6:
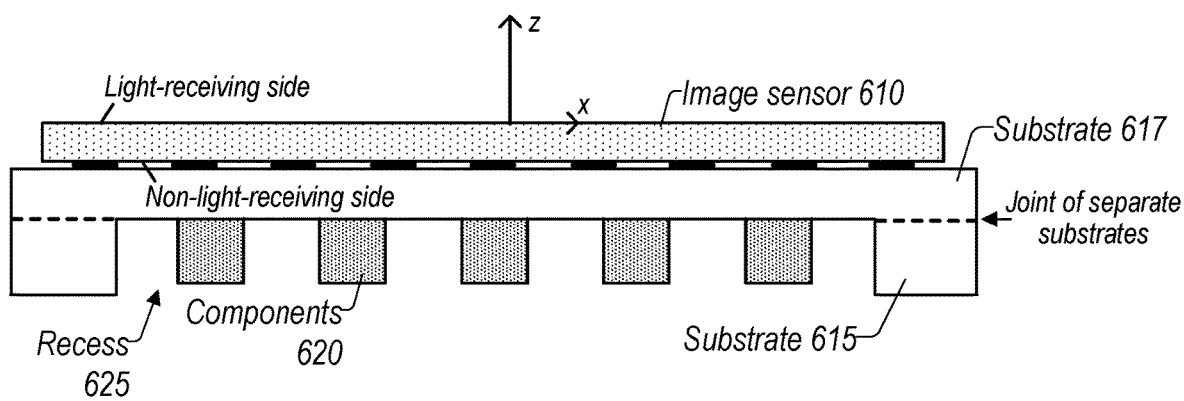
FIG. 6 shows another example substrate assembly, according to some embodiments.

In some embodiments, it may be challenging to access components inside a recess of a substrate in order to place the components to the substrate. For instance, if the recess is too small, it 5 may be hard to apply solder paste into the recess for soldering the components to the substrate. Thus, in some embodiments, a recess may be formed after placement of the components or around the same time as placement of the component. FIG. 6 shows another example substrate assembly to facilitate this implementation, according to some embodiments. As indicated in FIG. 6, a substrate for holding image sensor 610 and components 620 may not necessarily be a single integral piece of component. Rather, the substrate may be formed by two or more separate substrates joined together. In this example, the substrate may be formed using two substrate 615 and substrate 617. Substrates 615 and/or 617 may be an organic or a ceramic substrate. In some embodiments, substrate 615 may be part of a rigid-flex structure as described above, such as a rigid organic portion (e.g., a rigid PCB) of a rigid-flex structure. Substrates 616 and 617 may be formed in advance into respective shapes such that, after they are later joined together as indicated by the dashed line in FIG. 6, they may be able to form recess 625. For instance, in some embodiments, one or more portions of substrate 615 may be removed to form an opening through substrate 615, e.g., in the shape and/or size of recess 625. Next, components 620, such as surface mount devices, may be soldered to substrate 617. Subsequently, substrate 615 may be attached with substrate 617, such that components 620 that have already been placed to substrate 617 may now be held at least partially inside recess 625. The attachment of substrates 615 with 617 may be implemented using a solder paste, anisotropic conductive film (or ACF) tape, or surface mounting soldering (e.g., substrates 615 and 617 may include corresponding CSP packages at the joint such that the two substrates may be soldered together). Alternatively, in some embodiments, attachment of substrate 615 with substrate 617 may be performed around the same time as components 620 are placed to substrate 617, e.g., within a same reflow process.

Figure 7:
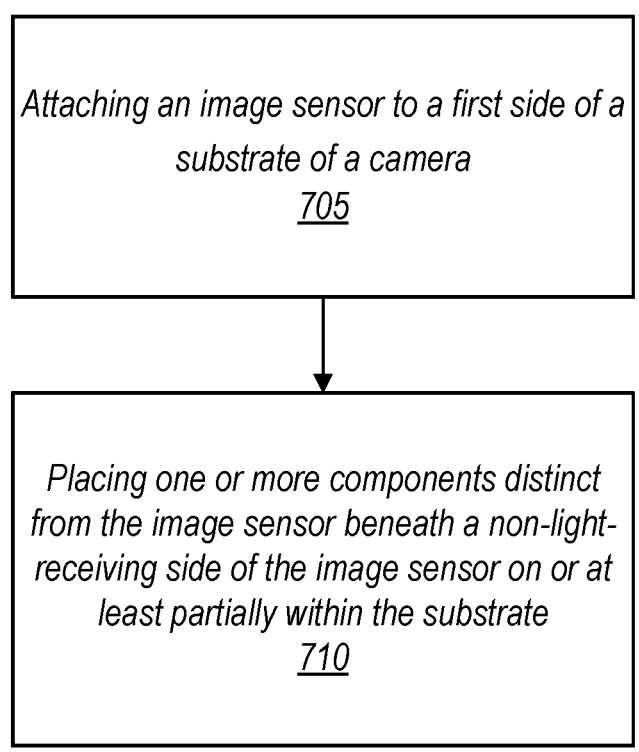
FIG. 7 shows techniques and methods for placing image sensor and one or more additional components on a substrate, according to some embodiments.

FIG. 7 is a high-level flowchart showing techniques and methods for placing components distinct from an image sensor at an opposite side of a substrate, according to some embodiments. In FIG. 7, an image sensor may be attached to a substrate at a first side of the substrate of a camera, as indicated in block 705. As described above in FIGS. 1-6, in some embodiments, the image sensor may have a light-receiving side (facing one or more lenses of the camera) and a non-light-receiving side opposite the light-receiving side, such that the light-receiving side of the image sensor may receive light having passed through the lenses to capture an image. The image sensor may use a CSP, a wirebond package, or one of other appropriate packages. The substrate may include an organic substrate, a ceramic substrate, a combination of both organic and ceramic portions, or a substrate using any other appropriate substrate materials. Next, one or more components distinct from the image sensor may be placed beneath the non-light-receiving side of the image sensor on or at least partially within the substrate, as indicated in block 710. As described above, in some embodiments, the components may be attached to a second side of the substrate opposite the first side where the image sensor is mounted, beneath the image sensor, at least partially inside one or more recesses. For instance, the components may be placed inside the recesses behind the image sensor along an optical axis such that the components may at least partially overlap with the image sensor. Alternatively, in some embodiments, the components may be embedded at least partially inside the substrate beneath the non-light-receiving side of the image sensor, e.g., behind the image sensor along the optical axis such that the embedded components and the image sensor may be at least partially overlaid with each other. As described above, the recesses and/or space for embedding of the components may be implemented by removing a portion of one or more laminated layers of the substrate. When using the embedding design, the components may be further covered to be buried inside the substrate. In some embodiments, the components may include one or more discrete components separate and different from the image sensor, such as a capacitor, a power supply such as a LDO regulator, a resistor, an inductor, a sensor, a coil, a driver for an actuator, or other components. The components may be used to support operations of image sensor 110, e.g., to provide appropriate voltages, implement actuation or movement functions, and/or transmit signals between image sensor 120 and other components. In some embodiments, one or more of the components may be a surface mount component. As the goal is to reduce the footprint of the substrate assembly, in some embodiments, as many components as allowed may be placed inside the recess at the second side of the substrate. Note that FIG. 7 is only an example for purposes of illustration. In some embodiments, the techniques and methods described in FIG. 7 may be performed in a different order. For instance, in some embodiments, the one or more components distinct from the image sensor may be placed to the substrate (e.g., at the second side of the substrate as described above) first at one or more positions, and next the image sensor may be attached at another side of the substrate (e.g., at the first side of the substrate) at a position opposite the components. Alternatively, in some embodiments, the image sensor and the distinct components may be assembled to the substrate around the same time, e.g., within a same reflow process.

Figure 8:
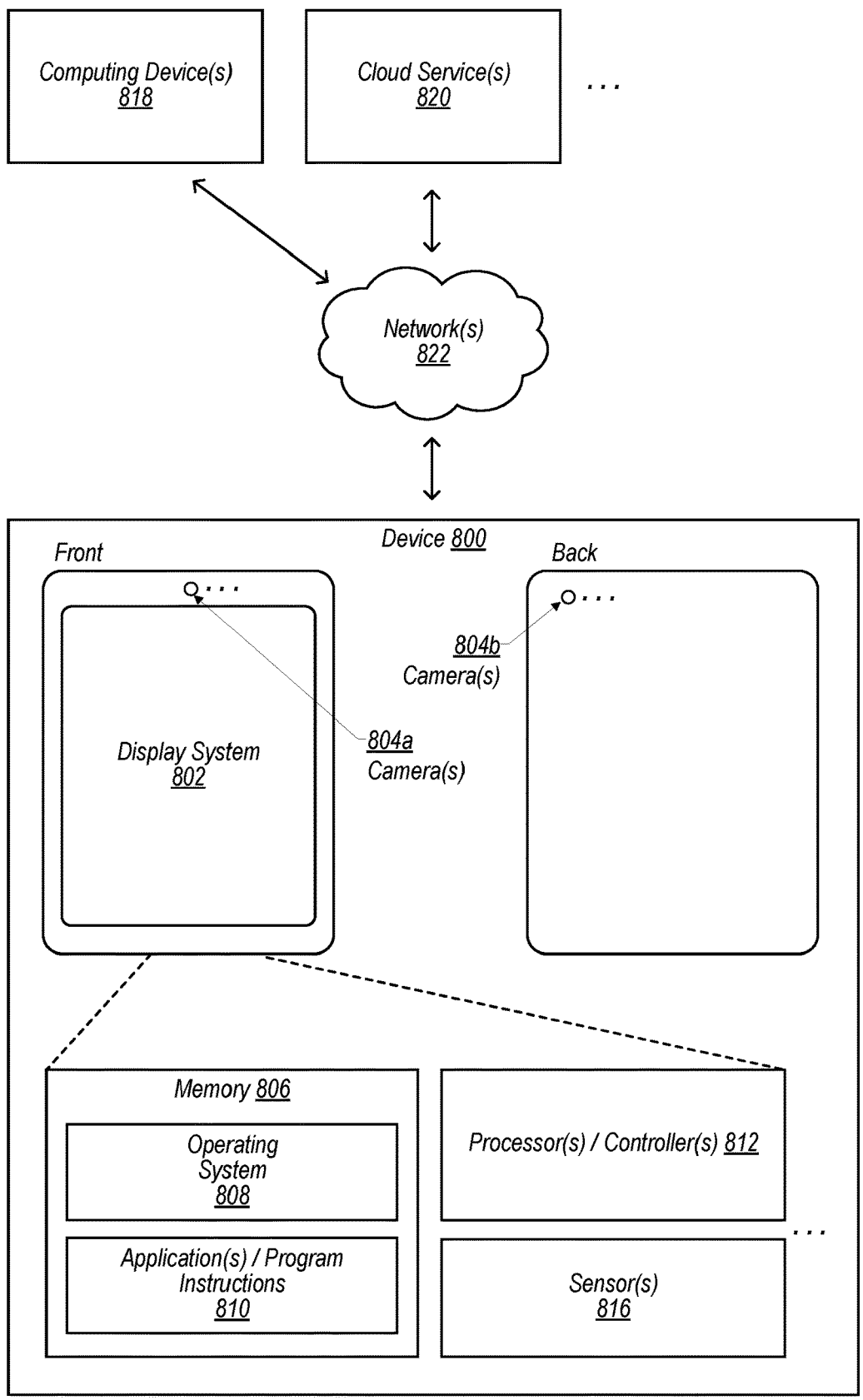
FIG. 8 shows a schematic representation of an example device that may include a camera having a substrate for component placement, according to some embodiments.

FIG. 8 illustrates a schematic representation of an example device 800 that may include a camera having a substrate for components placements, e.g., as described herein with reference to FIGS. 1-7, according to some embodiments. In some embodiments, the device 800 may be a mobile device and/or a multifunction device. In various embodiments, the device 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 800 may include a display system 802 (e.g., comprising a display and/or a touch-sensitive surface) and/or one or more cameras 804. In some non-limiting embodiments, the display system 802 and/or one or more front-facing cameras 804a may be provided at a front side of the device 800, e.g., as indicated in FIG. 8. Additionally, or alternatively, one or more rear-facing cameras 804b may be provided at a rear side of the device 800. In some embodiments comprising multiple cameras 804, some or all of the cameras may be the same as, or similar to, each other. Additionally, or alternatively, some or all of the cameras may be different from each other. In various embodiments, the location(s) and/or arrangement(s) of the camera(s) 804 may be different than those indicated in FIG. 8.

Among other things, the device 800 may include memory 806 (e.g., comprising an operating system 808 and/or application(s)/program instructions 810), one or more processors and/or controllers 812 (e.g., comprising CPU(s), memory controller(s), display controller(s), and/or camera controller(s), etc.), and/or one or more sensors 816 (e.g., orientation sensor(s), proximity sensor(s), and/or position sensor(s), etc.). In some embodiments, the device 800 may communicate with one or more other devices and/or services, such as computing device(s) 818, cloud service(s) 820, etc., via one or more networks 822. For example, the device 800 may include a network interface (e.g., network interface 910 in FIG. 9) that enables the device 800 to transmit data to, and receive data from, the network(s) 822. Additionally, or alternatively, the device 800 may be capable of communicating with other devices via wireless communication using any of a variety of communications standards, protocols, and/or technologies. Note that the device 800 is only presented as an example for purposes of illustration and shall not limit the present disclosure. As described above, the device 800 including the camera or substrate assembly described above may be used for a variety of applications, such as commercial electronics, automotive products, products with or without a display, etc. Further, the image sensor included in the device 800 may include various types of sensors, such as a CCD sensor, CMOS sensor, thermal sensor, SPAD sensor, and so on.

Figure 9:
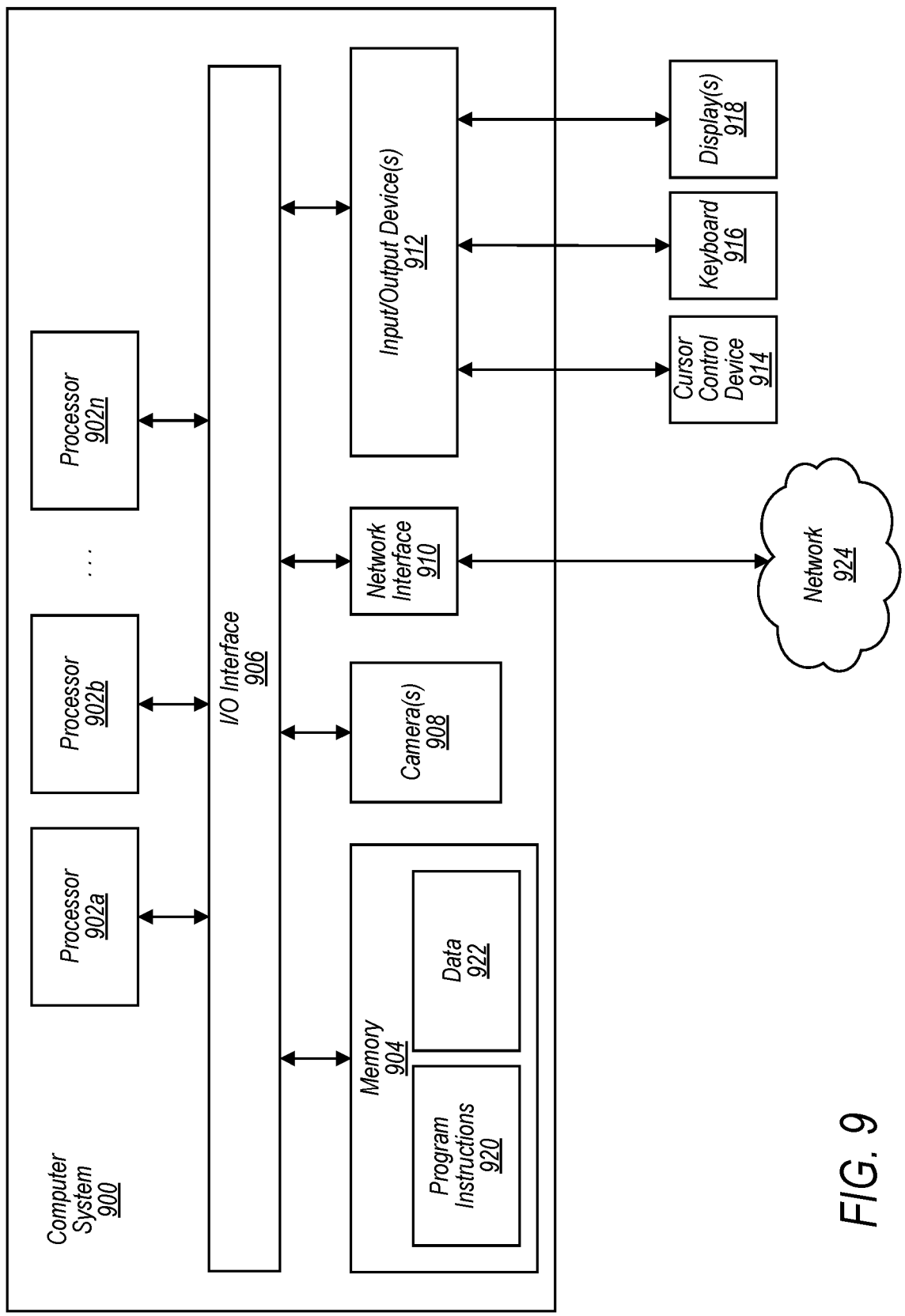
FIG. 9 shows a schematic block diagram of an example computer system that may include a camera having a substrate for component placement, according to some embodiments.

FIG. 9 illustrates a schematic block diagram of an example computing device, referred to as computer system 900, that may include or host embodiments of a camera having a substrate for components placements, e.g., as described herein with reference to FIGS. 1-8, according to some embodiments. In addition, computer system 900 may implement methods for controlling operations of the camera and/or for performing image processing images captured with the camera. In some embodiments, the device 800 (described herein with reference to FIG. 8) may additionally, or alternatively, include some or all of the functional components of the computer system 900 described herein. For instance, the computer system 900 may be part of the device 800 that further may be part of a mobile multipurpose device, a sensing system for automobiles, or another type of products with or without a display. In addition, the device 800 may include an image sensor that may include a CCD sensor, CMOS sensor, thermal sensor, SPAD sensor, and so on.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 900 includes one or more processors 902 coupled to a system memory 904 via an input/output (I/O) interface 906. Computer system 900 further includes one or more cameras 908 coupled to the I/O interface 906. Computer system 900 further includes a network interface 910 coupled to I/O interface 906, and one or more input/output devices 912, such as cursor control device 914, keyboard 916, and display(s) 918. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 8900 that are distinct from those nodes implementing other elements.

In various embodiments, computer system 900 may be a uniprocessor system including one processor 902, or a multiprocessor system including several processors 902 (e.g., two, four, eight, or another suitable number). Processors 902 may be any suitable processor capable of executing instructions. For example, in various embodiments processors 902 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 902 may include additional types of processors, such as graphics processing units (GPUs), application specific integrated circuits (ASICs), etc. In multiprocessor systems, each of processors 902 may commonly, but not necessarily, implement the same ISA. In some embodiments, computer system 900 may be implemented as a system on a chip (SoC). For example, in some embodiments, processors 902, memory 904, I/O interface 906 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 904 may be configured to store program instructions 920 accessible by processor 902. In various embodiments, system memory 904 may be implemented using any suitable memory technology, such as static random access memory (SRAM), synchronous dynamic RAM (SDRAM), nonvolatile/Flash-type memory, or any other type of memory. Additionally, existing camera control data 922 of memory 904 may include any of the information or data structures described above. In some embodiments, program instructions 920 and/or data 922 may be received, sent or stored upon different types of computer-accessible media or on similar media separate from system memory 904 or computer system 900. In various embodiments, some or all of the functionality described herein may be implemented via such a computer system 900.

In one embodiment, I/O interface 906 may be configured to coordinate I/O traffic between processor 902, system memory 904, and any peripheral devices in the device, including network interface 910 or other peripheral interfaces, such as input/output devices 912. In some embodiments, I/O interface 906 may perform any necessary protocol, timing or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments some or all of the functionality of I/O interface 906, such as an interface to system memory 904, may be incorporated directly into processor 902.

Network interface 910 may be configured to allow data to be exchanged between computer system 900 and other devices attached to a network 924 (e.g., carrier or agent devices) or between nodes of computer system 900. Network 924 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 910 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 912 may, in some embodiments, include one or more display terminals, keyboards, keypads, touchpads, scanning devices, voice or optical recognition devices, or any other devices suitable for entering or accessing data by one or more computer systems 900. Multiple input/output devices 912 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 910.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more lenses;
   an image sensor attached to a first side of a substrate, the image sensor having a light-receiving side and a non-light-receiving side opposite the light-receiving side, the light-receiving side configured to receive light having passed through the one or more lenses and incident on the light-receiving side to capture an image, wherein the image sensor has a lateral perimeter within a plane orthogonal to an optical axis of the light incident on the light-receiving side; and
   one or more discrete components distinct from the image sensor and that are placed beneath the non-light-receiving side of the image sensor within a spatial region having a same lateral perimeter as the image sensor.

2. The system of claim 1, wherein the one or more components are embedded at least partially within the substrate, beneath the non-light-receiving side of the image sensor.

3. The system of claim 1, wherein the one or more components are attached to a second side of the substrate opposite the first side of the substrate, beneath the non-light-receiving side of the image sensor, inside one or more recesses at the second side of the substrate.

4. The system of claim 3, wherein the one or more components include multiple components, wherein the one or more recesses include multiple recesses separate from each other, and wherein the multiple components are divided into multiple groups each of which is placed inside a respective one of the multiple recesses.

5. The system of claim 1, wherein the image sensor uses a chip scale package (CSP).

6. The system of claim 1, wherein the image sensor uses a wirebond package.

7. The system of claim 1, wherein at least one of the one or more components is a surface mount component.

8. The system of claim 1, wherein the one or more components include at least one of a capacitor, a voltage regulator, a resistor, an inductor, a sensor, a coil, or a driver for an actuator.

9. The system of claim 1, wherein the substrate may include at least one thermal via for thermal dissipation of the one or more components.

10. The system of claim 1, wherein the substrate further includes at least one layer to provide electromagnetic interference (EMI) or thermal insulation between the image sensor at the first side of the substrate and the one or more components beneath the non-light-receiving side of the image sensor.

11. A device, comprising:
    one or more lenses;
    an image sensor attached to a first side of a substrate, the image sensor having a light-receiving side, and a non-light-receiving side opposite the light-receiving side, the light-receiving side configured to receive light having passed through the one or more lenses and incident on the light-receiving side to generate one or more signals, wherein the image sensor has a lateral perimeter within a plane orthogonal to an optical axis of the light incident on the light-receiving side;
    a processor configured to process the one or more signals generated from the image sensor to generate an image; and
    one or more discrete components distinct from the image sensor and that are placed beneath the non-light-receiving side of the image sensor within a spatial region having a same lateral perimeter as the image sensor.

12. The device of claim 11, wherein the one or more components are attached to a second side of the substrate opposite the first side of the substrate, beneath the non-light-receiving side of the image sensor, at least partially inside one or more recesses at the second side of the substrate.

13. The device of claim 11, wherein the one or more components are embedded at least partially within the substrate, beneath the non-light-receiving side of the image sensor.

14. The device of claim 11, wherein the image sensor uses a chip scale package (CSP).

15. The device of claim 11, wherein the image sensor uses a wirebond package.

16. The system of claim 11, wherein at least one of the one or more components is a surface mount component.

17. The system of claim 11, wherein the one or more components include at least one of a capacitor, a voltage regulator, a resistor, an inductor, a sensor, a coil, or a driver for an actuator.

18. A method, comprising:
    attaching an image sensor to a first side of a substrate, the image sensor having a light-receiving side and a nonlight-receiving side opposite the light-receiving side, the light-receiving side configured to receive light having passed through one or more lenses and incident on the light-receiving side to capture an image, wherein the image sensor has a lateral perimeter within a plane orthogonal to an optical axis of the light incident on the light-receiving side; and placing one or more discrete components distinct from the image sensor beneath the non-light-receiving side of the image sensor, wherein the one or more components are (1) attached to a second side of the substrate opposite the first side of the substrate inside one or more recesses, each recess having a respective recess lateral perimeter that lies within the lateral perimeter of the image sensor, or (2) embedded at least partially within a portion of the substrate having a same lateral perimeter as the image sensor.

19. The method of claim 18, wherein the image sensor uses a chip scale package (CSP) or a wirebond package.

20. The method of claim 19, wherein the CSP package of the image sensor includes a ball grid array (BGA) package.

\* \* \* \* \*